(12) United States Patent
Clark et al.

(10) Patent No.: US 7,165,730 B2
(45) Date of Patent: Jan. 23, 2007

(54) WATER IRRIGATION SYSTEM WITH MOISTURE GAUGE AND METHOD OF CONTROLLING IRRIGATION

(75) Inventors: James Jolly Clark, 406 Wallis Dr., Austin, TX (US) 78746; Michael T. Perkins, Austin, TX (US); David Small, Bastrop, TX (US)

(73) Assignee: James Jolly Clark, Austin, TX (US)

( * ) Notice: Subject to any disclaimer, the term of this patent is extended or adjusted under 35 U.S.C. 154(b) by 212 days.

(21) Appl. No.: 10/809,990

(22) Filed: Mar. 26, 2004

(65) Prior Publication Data

US 2005/0211791 A1    Sep. 29, 2005

(51) Int. Cl.
*A01G 27/00* (2006.01)
*B05B 3/00* (2006.01)
*B05B 3/18* (2006.01)

(52) U.S. Cl. ............. 239/67; 239/63; 239/64; 239/65; 239/66; 239/68; 239/69; 239/70; 239/723; 239/726

(58) Field of Classification Search ............ 239/63–70, 239/71, 77, 723, 726; 700/11, 284, 283
See application file for complete search history.

(56) References Cited

U.S. PATENT DOCUMENTS

| | | | | |
|---|---|---|---|---|
| 3,578,245 A | * | 5/1971 | Brock | .......... 239/66 |
| 3,581,197 A | * | 5/1971 | Morey et al. | .......... 324/690 |
| 4,540,936 A | * | 9/1985 | Walsh | .......... 324/690 |
| 4,567,563 A | | 1/1986 | Hirsch | |
| 4,583,399 A | | 4/1986 | Walsh et al. | |
| 4,613,764 A | | 9/1986 | Lobato | |
| 4,683,904 A | * | 8/1987 | Iltis | .......... 137/78.3 |
| 4,998,826 A | * | 3/1991 | Wood et al. | .......... 374/129 |
| 5,208,855 A | | 5/1993 | Marian | |
| 5,218,866 A | | 6/1993 | Phillips et al. | |
| 5,311,769 A | | 5/1994 | Hetzel | |
| 5,333,785 A | * | 8/1994 | Dodds et al. | .......... 239/69 |

(Continued)

OTHER PUBLICATIONS

Allen et al., "Crop Evapotranspiration -Guidelines for Computing Crop Water Requirements—FAO Irrigation and Drainage Paper 56," Food and Agriculture Organization of the U.N., Rome, 1998.

(Continued)

*Primary Examiner*—Davis Hwu
(74) *Attorney, Agent, or Firm*—Meyertons, Hood, Kivlin, Kowert & Goetzel, P.C.; Eric B. Meyertons

(57) ABSTRACT

A water irrigation system may include a computer system, a sensing unit, an irrigation controller, and/or a water delivery system. The sensing unit may include a moisture gauge. The moisture gauge may include a capacitor coupled to a collector. The sensing unit may assess an amount of moisture in the collector and provide output that is a function of the amount of moisture in the collector to the computer system. The computer system may control irrigation of a zone to be irrigated at least partially based on the assessed amount of moisture in the collector. A method of controlling irrigation may include assessing an amount of moisture in a collector near or in a zone to be irrigated and controlling irrigation at least partially based on the assessed amount of moisture in the collector.

17 Claims, 5 Drawing Sheets

U.S. PATENT DOCUMENTS

| | | | |
|---|---|---|---|
| 5,424,649 A * | 6/1995 | Gluck et al. | 324/667 |
| 5,445,178 A * | 8/1995 | Feuer | 137/1 |
| 5,465,904 A | 11/1995 | Vaello | |
| 5,696,671 A | 12/1997 | Oliver | |
| 5,839,660 A | 11/1998 | Morgenstern et al. | |
| 5,870,302 A | 2/1999 | Oliver | |
| 5,920,827 A | 7/1999 | Baer et al. | |
| 6,298,285 B1 | 10/2001 | Addink et al. | |
| 6,314,340 B1 | 11/2001 | Mecham et al. | |
| 6,675,098 B1 | 1/2004 | Peek et al. | |
| 2003/0120393 A1 | 6/2003 | Bailey et al. | |
| 2003/0179102 A1 | 9/2003 | Barnes | |
| 2004/0011880 A1 | 1/2004 | Addink et al. | |
| 2004/0015270 A1 | 1/2004 | Addink et al. | |

OTHER PUBLICATIONS

Pope et al., "Potential Evapotranspiration for Irrigation Water Management in Urban Landscapes—The San Antonio Experience," National Irrigation Symposium, Proceedings of the 4$^{th}$ Decennial Symposium (Nov. 2000, Phoenix, AZ, ASAE).

* cited by examiner

WATER IRRIGATION SYSTEM WITH MOISTURE GAUGE AND METHOD OF CONTROLLING IRRIGATION

BACKGROUND

1. Field of Invention

The present invention generally relates to a water irrigation system. More particularly, the invention relates to a sensing unit that assesses climatological conditions in or near a zone to be irrigated and a computer system that uses the assessed climatological conditions and historical evapotranspiration data to assess an irrigation need of the zone to be irrigated. The computer system may control irrigation to at least meet the irrigation need of the zone to be irrigated.

2. Description of Related Art

Water irrigation systems are used in residential, agricultural, and commercial settings. Some water irrigation systems use historical and/or predictive climatological data (e.g., evapotranspiration data, precipitation data), restrictive data, and/or climatological conditions to adjust irrigation of a zone to be irrigated. Some water irrigation systems include local control and/or remote intelligence from a centralized data source. U.S. Pat. No. 5,839,660 to Morgenstern et al.; U.S. Pat. No. 5,465,904 to Vaello; U.S. Pat. No. 5,870,302 to Oliver; U.S. Pat. No. 5,696,671 to Oliver; U.S. Pat. No. 4,613,764 to Lobato; U.S. Pat. No. 6,314,340 to Mecham et al.; U.S. Pat. No. 4,567,563 to Hirsch; U.S. Pat. No. 6,298,285 to Addink et al.; U.S. Pat. No. 5,311,769 to Hetzel; and 5,208,855 to Marian; and U.S. Patent Publication Nos. 2003/0120393 to Bailey et al.; 2004/0011880 to Addink et al.; 2004/0015270 to Addink et al.; and 2003/0179102 to Barnes, all of which are incorporated by reference as if fully set forth herein, describe water irrigation systems. U.S. Pat. No. 5,920,827 to Baer et al.; U.S. Pat. No. 6,675,098 to Peek et al.; U.S. Pat. No. 5,218,866 to Phillips et al.; and U.S. Pat. No. 4,583,399 to Walsh et al., all of which are incorporated by reference as if fully set forth herein, describe devices for assessing one or more climatological conditions.

SUMMARY

A water irrigation system may include a computer system, a sensing unit, an irrigation controller, and/or a water delivery system (e.g., water source, master control valve, conduits, irrigation devices). The sensing unit may include a solar panel, a moisture gauge, a temperature sensor, and/or a wind sensor. The sensing unit may be located remotely from the computer system. The sensing unit may provide signals to the computer system based on climatological conditions near or in a zone to be irrigated. In some embodiments, the computer system may use the signals from the sensing unit to assess evapotranspiration near or in the zone to be irrigated ("zonal" evapotranspiration).

In an embodiment, a data storage unit of a computer system may include evapotranspiration data derived from regional climatological data. For example, regions of the United States may be identified by all or a portion of a postal code. The evapotranspiration data may include average seasonal (e.g., monthly) values by region. In an embodiment, a computer system may use average regional evapotranspiration to assess an irrigation need and/or control irrigation of a zone to be irrigated. In some embodiments, a computer system may use average regional evapotranspiration in combination with zonal evapotranspiration to assess an irrigation need and/or control irrigation of the zone to be irrigated. In certain embodiments, a computer system may use average regional evapotranspiration in combination with zonal evapotranspiration and climatological conditions near or in the zone to be irrigated to assess an irrigation need and/or control irrigation of the zone to be irrigated.

In an embodiment, a water irrigation system may include a computer system and a sensing unit. The sensing unit may include a solar panel. The solar panel may provide output to the computer system based on an amount of sunlight received by the solar panel. The computer system may assess solar insolation based on the output from the solar panel. The computer system may control irrigation of a zone to be irrigated based at least in part on the assessed solar insolation.

In some embodiments, a method of controlling irrigation may include assessing solar insolation from output provided by a solar panel and controlling irrigation at least partially based on the assessed solar insolation. Controlling irrigation may include assessing evapotranspiration of the zone to be irrigated at least partially based on the assessed solar insolation.

In an embodiment, a water irrigation system may include a computer system and a sensing unit. In some embodiments, a sensing unit of a water irrigation system may include a moisture gauge. The moisture gauge may include a collector to receive moisture. A flex circuit including a capacitor may be coupled to the collector. The capacitor may be part of a resonant circuit. A change in an amount of moisture in the collector may alter a frequency of the resonant circuit. Output based on the frequency of the resonant circuit may be provided to a computer system. The computer system may assess an amount of moisture in the collector by assessing the frequency of the resonant circuit. The computer system may control irrigation at least partially based on the assessed amount of moisture in the collector.

In some embodiments, a method of controlling irrigation may include assessing an amount of moisture in a collector near or in a zone to be irrigated. Assessing an amount of moisture in a collector near or in a zone to be irrigated may include assessing a frequency of a resonant circuit coupled to the collector. In certain embodiments, a computer system may control irrigation at least partially based on an assessed amount of moisture in the collector.

In an embodiment, a water irrigation system may include a computer system and a sensing unit. In some embodiments, a sensing unit of a water irrigation system may include a wind sensor. The wind sensor may include a flow thermistor and a reference thermistor. The thermistors may be coupled such that output from the thermistors is a function of wind speed at the flow thermistor. A computer system may use output from the thermistors in combination with output from a calibration thermistor to assess wind speed at the flow thermistor. In certain embodiments, the computer system may control irrigation at least partially based on the assessed wind speed.

In some embodiments, a method of controlling irrigation may include assessing a wind speed as a function of temperature at least 2 meters above a zone to be irrigated. An irrigation need of the zone to be irrigated may be assessed at least partially based on the assessed wind speed. In certain embodiments, irrigation may be controlled to at least meet the assessed irrigation need of the zone to be irrigated.

In an embodiment, a computer system of a water irrigation system may include an infrared receiver. The infrared receiver may receive an infrared signal from a portable device having an infrared transmitter. The portable device may allow a user to provide instructions to the computer system through infrared data exchange or loading. The instructions may include initialization information such as, but not limited to, a month, a day of a month and/or week, a time of day, a soil type, a vegetation type, a stress factor, and a regional identifier. The computer system may control irrigation at least partially based on one or more signals from the portable device.

In some embodiments, a method of controlling irrigation may include providing an infrared signal from a portable device having an infrared transmitter and allowing an infrared receiver of a computer system of a water irrigation system to receive the infrared signal. The method may further include controlling irrigation at least partially based on the infrared signal.

In an embodiment, a water irrigation system may include a computer system and a sensing unit. The sensing unit may be elevated at least 2 meters above the computer system. The sensing unit may include a solar panel. The solar panel may use sunlight to produce electricity and provide at least a portion of the electricity to the sensing unit. The sensing unit may assess climatological conditions. The sensing unit may communicate wirelessly with the computer system. The sensing unit may provide output that is a function of the assessed climatological conditions to the computer system. In some embodiments, the computer system may control irrigation of a zone to be irrigated at least partially based on the output of the sensing unit.

In an embodiment, a method of controlling irrigation may include receiving sunlight with a solar panel, using the received sunlight to produce electricity, and using at least a portion of the electricity to assess climatological conditions. The method may further include transmitting output that is a function of the assessed climatological conditions to a computer system, and allowing the computer system to control irrigation of a zone to be irrigated at least partially based on the assessed climatological conditions.

In an embodiment, a water irrigation system may include a computer system and a sensing unit. The sensing unit may include a solar panel. The solar panel may be designed to receive sunlight, to use the received sunlight to produce electricity, and to supply at least a portion of the electricity to the sensing unit. The computer system may be designed to receive community irrigation instructions and to control irrigation based at least in part on the community irrigation instructions.

In some embodiments, a method of controlling irrigation may include receiving sunlight, using the received sunlight to produce electricity, and supplying at least a portion of the electricity to at least a portion of a water irrigation system. The method may further include receiving community irrigation instructions and allowing the computer system to control irrigation based at least in part on the community irrigation instructions.

BRIEF DESCRIPTION OF THE DRAWINGS

Advantages of the present invention will become apparent to those skilled in the art with the benefit of the following detailed description and upon reference to the accompanying drawings in which.

Figure 1:
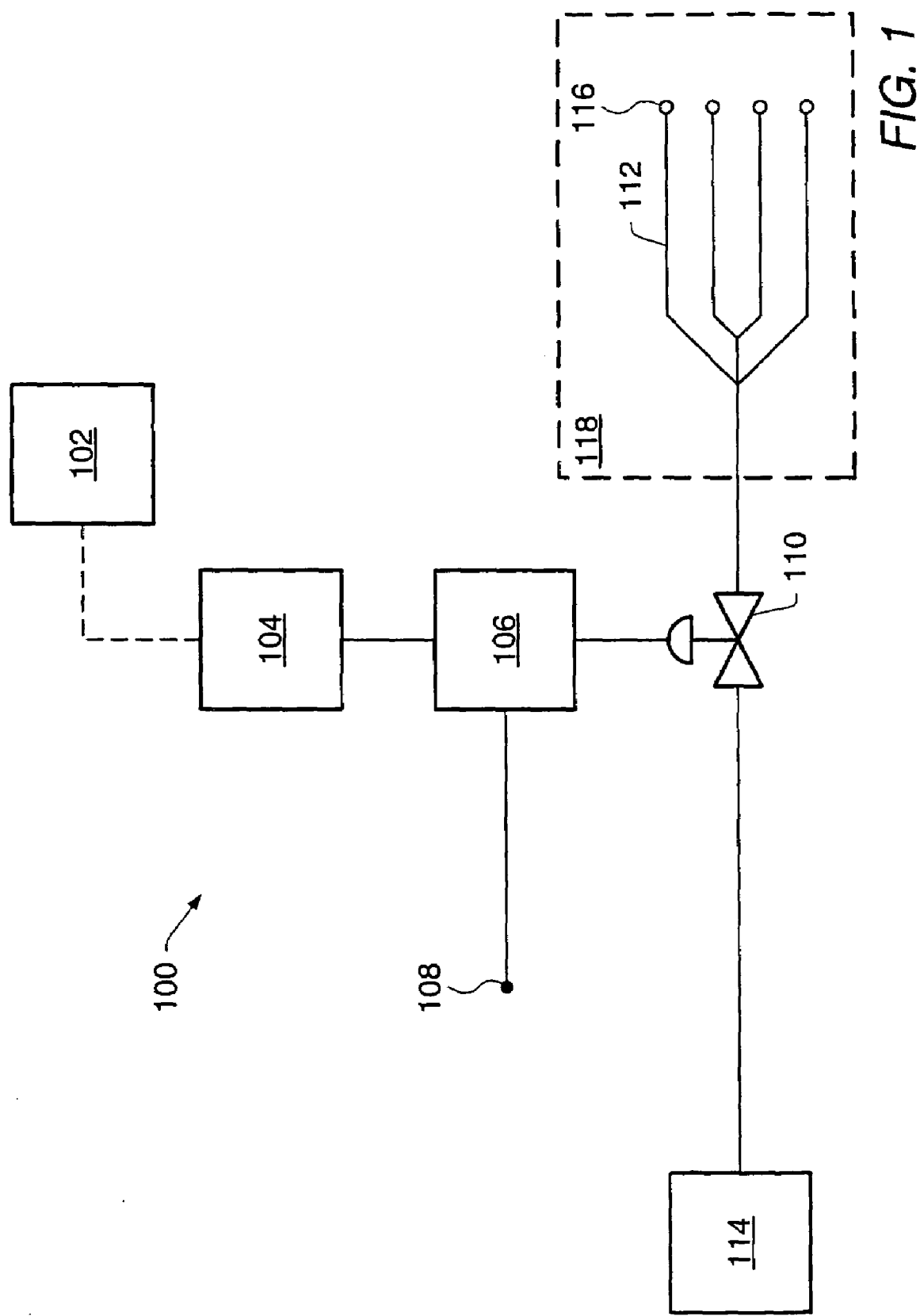
FIG. 1 depicts a schematic of an embodiment of a water irrigation system.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

A water irrigation system may be designed to control irrigation of a zone to be irrigated to promote water conservation while maintaining a desired appearance and allowing enough growth to maintain healthy vegetation. As used herein, to "control" irrigation generally means to initiate, terminate, inhibit, adjust a duration and/or frequency of, regulate, or otherwise effect irrigation. As used herein, a "zone to be irrigated" generally refers to a volume that receives or is intended to receive water from a water irrigation system during an irrigation cycle. A lower boundary of the volume is the surface that receives or is intended to receive water from the water irrigation system. An upper boundary of the volume is determined by an average height that water travels from the irrigation devices during irrigation. As used herein, an "irrigation cycle" generally includes initiation of irrigation with a water irrigation system, delivery of water to a zone to be irrigated, and termination of irrigation. In an embodiment, a water irrigation system may include one or more computer systems and one or more sensing units. In some embodiments, a water irrigation system may include a computer system, a sensing unit, and a water delivery system. In certain embodiments, a water irrigation system may include an irrigation controller.

In an embodiment, a water delivery system may include a water source. A water delivery system may include in-ground and/or above-ground components. In some embodiments, a water delivery system may include one or more valves coupled to one or more conduits (e.g., pipes, hoses, spillways, ditches), with at least a portion of each conduit designed to carry water. In some embodiments, a water delivery system may include one or more irrigation devices (e.g., sprinklers, misters, drip hoses). In certain embodiments, a water delivery system may include a master control valve. The master control valve may allow delivery of water from a water source to one or more conduits of a water delivery system. Water flowing through one or more conduits of a water delivery system may be used to irrigate a zone to be irrigated.

In an embodiment, a water irrigation system may include an irrigation controller. An irrigation controller may be coupled to a master control valve of a water delivery system. In some embodiments, a signal from an irrigation controller may be used to operate a master control valve of a water delivery system. For example, an irrigation controller may store and implement an irrigation schedule determined by a user. As used herein, "irrigation schedule" generally refers to one or more irrigation cycles chosen to occur at one or more times on one or more days for a desired duration. In an embodiment, a computer system may be coupled to and/or be in communication with an irrigation controller of a water irrigation system. In some embodiments, instructions from a computer system coupled to or in communication with an irrigation controller of a water irrigation system may control water flow through a water delivery system. For example, a computer system coupled to or in communication with an irrigation controller may initiate and/or terminate irrigation and/or override and/or alter an irrigation cycle or irrigation schedule of the irrigation controller.

As used herein, "coupled" portions of a water irrigation system may be directly connected or indirectly connected (e.g., connected through one or more intervening members). As used herein, a first portion of a water irrigation system "in communication with" a second portion of the water irrigation system may transmit information to and/or receive information from the second portion of the water irrigation system. Information may be transmitted or received via various media including, but not limited to, wiring, cables (e.g., fiber optic cable), and electrical, electromagnetic, and/or magnetic signals.

As used herein, a "computer system" generally refers to one or more electronic components used to receive and process data. A computer system may include, but is not limited to, a simple logic device, a programmable logic controller, a processor, a central processing unit, a microprocessor, a microprocessing unit, a programmable device, and a programmable electronic system. A computer system may include software designed to perform calculations and comparisons and to send instructions to other components of the computer system. As used herein, "computer system" may refer to two or more computer systems that are coupled or in communication. For example, a first computer system may assess information from a sensing unit of a water irrigation system, and a second computer system may use the assessed information to control an irrigation controller of the water irrigation system. In some embodiments, two or more computer systems of a computer system may be separate units located near each other. In some embodiments, two or more computer systems of a computer system may be separate units located a distance from each other. In certain embodiments, two or more computer systems of a computer system may be housed together.

In an embodiment, a computer system of a water irrigation system may include one or more data storage units (e.g., EPROM, EEPROM). In some embodiments, a computer system of a water irrigation system may include components such as, but not limited to, a calendar, a real-time clock, and/or a battery. In some embodiments, a computer system may include a solar panel designed to receive sunlight and to produce electricity from the received sunlight. The solar panel may be used, for example, to power at least a portion of the computer system. In certain embodiments, a computer system of a water irrigation system may include a user interface. For example, a computer system of a water irrigation system may include switches to enable or disenable the computer system and/or certain features of the water irrigation system. In some embodiments, a computer system of a water irrigation system may include indicators to indicate a status related to components and/or operation of the water irrigation system.

In an embodiment, a computer system of a water irrigation system may include a receiver for receiving signals from a sensing unit. For example, a computer system may include a radiofrequency receiver for receiving a radiofrequency signal transmitted by a sensing unit. In some embodiments, a computer system of a water irrigation system may include a device (e.g., a paging device) for receiving community irrigation instructions. As used herein, a "community" generally refers to three or more separately owned properties that are irrigated independently. Community irrigation instructions may include community watering restrictions for purposes including water conservation (e.g., during droughts) and emergency restrictions (e.g., related to maintenance or repair of utilities). In some embodiments, community irrigation instructions received by a computer system may provide an override that requires a termination of irrigation or a reduction in frequency and/or duration of irrigation. In certain embodiments, community irrigation instructions received by a computer system may initiate irrigation under conditions including, but not limited, to wildfire hazard conditions.

In an embodiment, a computer system of a water irrigation system may include an infrared receiver and/or an infrared transceiver for receiving and/or transmitting infrared signals. For example, the infrared receiver or transceiver may receive signals from an infrared transmitting device including, but not limited to, a portable or hand-held device such as a personal digital assistant, cellular phone, or laptop computer. In some embodiments, a user may set parameters of a water irrigation system (e.g., initialize the system) by sending information from an infrared transmitting device to a computer system. As used herein, "parameters" of a water irrigation system may include, but are not limited to, a region code to identify a region, including a zone to be irrigated, soil type, vegetation type, stress factor, day, date, month, year, and time of day. In an embodiment, a user may enter instructions to initiate or terminate irrigation. In some embodiments, a user may enter instructions to set a frequency and/or duration of irrigation (e.g., an irrigation schedule).

In an embodiment, a sensing unit may be a component of the computer system. In an embodiment, a sensing unit may be housed with a computer system of a water irrigation system. In some embodiments, a sensing unit may be located remotely from a computer system of a water irrigation system. As used herein, components that are "located remotely" are generally positioned at least 1 m apart. For example, a sensing unit may be located 2 m or more (e.g., up to about 100 m) from the computer system.

In certain embodiments, a sensing unit may be positioned in or near a zone to be irrigated. As used herein, "near" a zone to be irrigated generally refers to within about 100 m of a boundary of the zone to be irrigated (e.g., displaced vertically, horizontally, or some combination thereof from a boundary of the zone to be irrigated). In certain embodiments, a sensing unit may be elevated from a computer system and/or above a zone to be irrigated. For example, the sensing unit may be elevated 2 m or more above the computer system. Elevating the sensing unit from the computer system may include, but is not limited to, mounting the sensing unit on a house, a building, or a pole. Elevating the sensing unit above the zone to be irrigated may allow the unit to remain relatively free from debris (e.g., grass clippings, dirt) and protect the unit from accidental damage (e.g., from lawn equipment, pedestrian traffic, animals). Elevating the sensing unit above the zone to be irrigated may allow the sensing unit to be advantageously placed away from trees, fences, etc., in a location that receives full exposure to environmental elements including, but not limited to, sunlight, wind, and precipitation. Elevating the sensing unit above the zone to be irrigated may inhibit water supplied by the irrigation system from entering the sensing unit.

In an embodiment, a sensing unit may include one or more sensors. For example, a sensing unit may include one or more sensors designed to sense climatological conditions. In some embodiments, sensors in a sensing unit may advantageously require relatively low amounts of current. Sensors that require relatively low amounts of current may be used with stand-alone (e.g., battery powered and/or solar powered) sensing units. A sensing unit designed to sense climatological conditions may include, but is not limited to, a wind sensor, a temperature sensor, a moisture gauge, a humidity sensor, and/or a solar insolation sensor. In some embodiments, a solar insolation sensor may include a solar panel. As used herein, "solar insolation" generally refers to an average amount of solar radiation that radiates within a given area per unit of time.

In an embodiment of a sensing unit that includes a solar panel, the solar panel may receive sunlight and produce electricity from the received sunlight. In some embodiments, the electricity may be used to power at least a portion of the sensing unit. In some embodiments, the electricity may be used to power at least a portion of a computer system. In certain embodiments, a sensing unit may include a solar panel and a battery. The battery may be rechargeable. The battery may be used to store electricity produced by the solar panel. In some embodiments, enough electricity may be stored in a battery to power a sensing unit for an extended length of time (e.g., at least two weeks) without direct sunlight.

In an embodiment, a sensing unit may provide output (e.g., a signal) to a computer system of a water irrigation system. As used herein, "output" and "signal" generally refer to a detectable physical quantity or impulse by which messages or information can be transmitted. "Output" and "signals" may include, but are not limited to, electrical output (e.g., voltage, current), electromagnetic output (e.g., electromagnetic radiation, electromagnetic field strength), magnetic output, and/or combinations thereof. In some embodiments, a computer system may assess one or more climatological conditions from a signal provided by a sensing unit near or in a zone to be irrigated. As used herein, to "assess" generally means to determine or estimate a quantity (e.g., a rate, an amount, a size, a value). In some embodiments, climatological conditions assessed by a computer system of a water irrigation system may be stored in a data storage unit of the computer system for future use in assessing an irrigation need of a zone to be irrigated. As used herein, "assessing" an irrigation need generally refers to estimating (e.g., predicting) an amount of irrigation that is necessary to maintain vegetation in a desired condition.

A computer system may be used to assess a water requirement and/or an irrigation need of a zone to be irrigated. As used herein, a "water requirement" generally refers to a predicted amount of water needed to maintain vegetation in a zone to be irrigated in a desired condition. As used herein, an "irrigation need" generally refers to a difference between a water requirement and the precipitation received by the zone to be irrigated. In an embodiment, water requirement and/or irrigation need may be expressed as linear amounts of water needed by vegetation in a zone to be irrigated. In some embodiments, water requirement and/or irrigation need may be expressed as linear amounts of water per unit time needed by vegetation in a zone to be irrigated. For example, an irrigation need of a zone to be irrigated may be expressed as centimeters of water per day or per month.

In an embodiment, a computer system may use historical climatological data for a region ("regional" data) that includes a zone to be irrigated to assess water requirement of the zone to be irrigated. In some embodiments, a computer system may use climatological data collected at a zone ("zonal" data) to be irrigated to assess a water requirement and/or an irrigation need of the zone to be irrigated. The climatological data may be collected by a sensing unit. In certain embodiments, a computer system may use historical climatological data for a region that includes a zone to be irrigated in combination with climatological data collected at the zone to be irrigated to assess a water requirement and/or an irrigation need of the zone to be irrigated. In certain embodiments, climatological conditions assessed by a computer system of a water irrigation system may be used for immediate control of irrigation. For example, irrigation may be inhibited for a length of time (e.g., a day) after an amount of moisture collected by a moisture gauge reaches a selected value and/or at least meets an irrigation need of a zone to be irrigated.

In an embodiment, a computer system may use historical evapotranspiration data for a region including a zone to be irrigated and/or assess evapotranspiration from climatological data from the zone to be irrigated. "Evapotranspiration" (ET) generally refers to the loss of moisture from soil through evaporation and transpiration by plants. Potential ET ("PET") refers to ET for reference vegetation in deep soil under well-watered conditions. "ET" and "PET" are used interchangeably herein. As used herein, ET generally refers to one or more ET values, ET rates, ET tables, etc. Climatological data including, but not limited to, temperature, solar insolation, wind speed, humidity, evaporation rate, and/or precipitation may be used to assess ET. In some embodiments, ET may be used as an estimate of water demand (e.g., water requirement) by plants. Actual water use by vegetation in a zone to be irrigated may vary with soil and other conditions. As used herein, "vegetation" generally refers to any form of plant life in a zone to be irrigated. "Vegetation" may include, but is not limited to, turf (e.g., St. Augustine, Zoysia, Bermuda, Buffalo), commercial crops, vegetable gardens, flower gardens, ornamental gardens, landscaping plants, wildflowers, and combinations thereof. ET at a zone to be irrigated may vary with factors including, but not limited to, type of plant, soil type, root depth, topography, micro-climate, and plant density.

ET may be calculated from climatological data using standardized or modified Penman methods (e.g., Penman-Monteith methods). U.S. Pat. No. 5,870,302 to Oliver, which is incorporated by reference as if fully set forth herein, describes calculation of ET with reference to the Penman method. "Crop Evapotranspiration—Guidelines for Computing Crop Water Requirements—FAO Irrigation and Drainage Paper 56," by Richard G. Allen et al. (Food and Agriculture Organization of the U.N., Rome, 1998), which is incorporated by reference as if fully set forth herein, describes calculation of ET using Penman-Monteith methods. ET may be calculated by other methods as described, for example in "Evapotranspiration and Irrigation Water Requirements," M. E. Jensen et al., eds. (American Society of Civil Engineers, New York, N.Y., 1990), which is incorporated by reference as if fully set forth herein. PET-based irrigation is described by Pope and Fipps in "Potential Evapotranspiration for Irrigation Water Management in Urban Landscapes—The San Antonio Experience", National Irrigation Symposium, Proceedings of the 4th Decennial Symposium (November 2000, Phoenix, Ariz., ASAE), which is incorporated by reference as if fully set forth herein.

Historical climatological data is available from the National Oceanic and Atmospheric Administration (Silver Spring, Md.). In some embodiments, historical climatological data may be used to assess average ET for a region ("regional ET"). In certain embodiments, soil and/or vegetation type may be used as a factor in assessing regional ET. A region may be determined by descriptors including, but not limited to, all or a portion of a postal code (e.g., the first three digits of a postal code), latitude and longitude grids, political boundaries (e.g., county lines), and combinations thereof. Average ET may be available from sources including networks (e.g., the TexasET Network). In some embodiments, regional ET may be stored in a data storage unit of a computer system. In certain embodiments, regional ET may be averaged over one or more years (e.g., five years) to smooth the data. Regional ET (e.g., daily, monthly) may be stored for various soil and/or vegetation types (or with correction factors for various soil and/or vegetation types) by region in lookup tables in a data storage unit of a computer system. In an embodiment, regional ET may be updated (e.g., annually, biennially) to include more recent historical climatological data. In some embodiments, a lookup table in a data storage unit of a computer system may be replaced (e.g., annually, biennially) with more recent regional ET. In certain embodiments, replacement lookup tables may be downloadable from the internet.

In some embodiments, climatological data collected at a zone to be irrigated (e.g., by a sensing unit) may be stored in a computer system and/or used to assess ET for the zone to be irrigated ("zonal ET"). In certain embodiments, a water requirement for a zone to be irrigated may be assessed using a combination (e.g., a weighted average) of regional ET and zonal ET. As zonal ET is assessed for a zone to be irrigated over time (e.g., 3 years, 5 years), zonal ET may be weighted exclusively or more heavily than regional ET by the computer system in assessing a water requirement of the zone to be irrigated. A water requirement of a zone to be irrigated may be combined with climatological data (e.g., precipitation amounts) collected at the zone to be irrigated by a sensing unit to assess an irrigation need of the zone to be irrigated. For example, subtracting precipitation amounts from a water requirement may yield an irrigation need of the zone to be irrigated.

In an embodiment, an irrigation need for a zone to be irrigated may be adjusted by a stress factor, as described by Pope and Fipps in "Potential Evapotranspiration for Irrigation Water Management in Urban Landscapes—The San Antonio Experience". Adjusting an irrigation need by a stress factor may reduce an irrigation need of a zone to be irrigated. Reducing an irrigation need of a zone to be irrigated may introduce stress to roots of vegetation in the zone to be irrigated. Roots may be kept moist for extended periods but cyclically stressed to inhibit prolonged saturation of the roots. Stressing the roots may promote an ability of the roots to absorb water and/or inhibit damage caused by over watering. Water conservation and/or reduced maintenance may be additional advantages of stressing roots in a zone to be irrigated.

A stress factor may be a multiplicative factor. For example, an irrigation need of a zone to be irrigated may be multiplied by a stress factor of 0.70 or 0.50, thus reducing the irrigation need of the zone to be irrigated. In some embodiments, an irrigation need of a zone to be irrigated may be multiplied by a stress factor of 1.0 (e.g., zero stress). In certain embodiments, a stress factor of greater than 1.0 may allow more water to be applied to a zone to be irrigated. As used herein, an irrigation need of a zone to be irrigated may include a stress factor selected according to soil type and/or vegetation type of the zone to be irrigated. In certain embodiments, a stress factor may be adjusted by an operator of a water irrigation system to alter an appearance of vegetation in a zone to be irrigated.

In some embodiments, a computer system and/or a sensing unit may be used in combination with a water delivery system and an irrigation controller adjusted to deliver a selected amount of water to a zone to be irrigated over a selected length of time. In certain embodiments, an irrigation controller may be adjusted to allow a water delivery system to automatically deliver a substantially constant amount of water during one or more irrigation cycles set to occur during a length of time (i.e., an assumed irrigation schedule). For example, an amount of water applied weekly may range from about 0.7 cm to about 7.0 cm. The irrigation controller may be adjusted to automatically allow irrigation every day (e.g., from about 0.1 cm to about 1 cm), every other day (e.g., from about 0.2 cm to about 2 cm), or two, three, four or more times a week. In an embodiment, an irrigation controller may be adjusted to deliver from about 0.5 cm to about 1 cm of water 3 times a week to a zone to be irrigated. For example, an irrigation controller may be adjusted to deliver about 0.6 cm of water 3 times a week to the zone to be irrigated. In certain embodiments, an irrigation schedule in a zone to be irrigated may be determined by a computer system (e.g., the water irrigation system may not include an irrigation controller, or an irrigation controller may not execute a predetermined irrigation schedule).

Historical regional ET (e.g., monthly regional ET for a year or averaged for two or more years) may be stored in a data storage unit of a computer system of a water irrigation system. In some embodiments, monthly regional ET may be combined with (e.g., averaged with) monthly zonal ET to yield a monthly water requirement for a zone to be irrigated. A monthly water requirement may be divided by the number of days in a month to yield a daily water requirement for the month. An irrigation need for the xth day of a month may be assessed by subtracting an amount of precipitation received (as assessed during the month by a sensing unit at the zone to be irrigated) during the first x days of the month from a total of daily ET for the first x days of the month. The irrigation need may be adjusted by a stress factor. A total amount of irrigation applied by a water irrigation system for the first x days of the month may be compared to the irrigation need. If the amount of irrigation applied exceeds the irrigation need, the computer system may inhibit one or more irrigation cycles (e.g., the next irrigation cycle) of the water irrigation system. If the irrigation need exceeds the amount of irrigation applied during the month (by, for example, 0.6 cm), the computer system may allow a scheduled irrigation cycle to proceed uninterrupted or initiate an irrigation cycle.

In some embodiments, a monthly average may be a running average that includes data for two or more months distributed about (e.g., substantially equally distributed about) day x of a month. For example, a daily water requirement for June 1 may be calculated by using a running average of the monthly water requirement for May and a monthly water requirement for June. Daily ET for June 5 may be calculated, for example, by using a running average for $\frac{1}{3}$ of May ET and $\frac{2}{3}$ of June ET and dividing the result by a chosen number of days (e.g., 30).

Climatological data collected at a zone to be irrigated (e.g., by a sensing unit) may be used for immediate control of irrigation of the zone to be irrigated. For example, precipitation received by the zone to be irrigated, as measured by a moisture gauge of a sensing unit, may reduce an irrigation need of the zone to be irrigated. In some embodiments, a maximum amount of precipitation per unit of time (e.g., 0.6 cm per day) may be used in assessing an irrigation need. The maximum amount of precipitation per unit of time may correspond to an amount that a zone to be irrigated can absorb before runoff occurs. In some embodiments, irrigation may be terminated if wind speed measured by a sensing unit exceeds a certain value for a selected length of time (e.g., 10 mph for 20 minutes). Terminating irrigation for excessive wind speed may promote water conservation by limiting water lost to poor distribution uniformity under windy conditions. In some embodiments, irrigation may be terminated if a temperature sensor indicates that temperature in the zone to be irrigated has fallen below a certain value (e.g., about 3° C.). Inhibiting irrigation close to freezing conditions may protect components of a water delivery system. In some embodiments, irrigation may be inhibited during daylight hours to avoid excessive evaporative loss of water.

FIG. 1 depicts a schematic of an embodiment of water irrigation system 100. Water irrigation system 100 may include sensing unit 102 and computer system 104. In some embodiments, sensing unit 102 may be located remotely from computer system 104. Sensing unit 102 may be coupled to (e.g., wired to) and/or in communication with (e.g., may be a component of) computer system 104. Water irrigation system 100 may include irrigation controller 106. Irrigation controller 106 may be coupled to alternating current source 108. Computer system 104 may be coupled to (e.g., wired to) and/or in communication with irrigation controller 106. In some embodiments, signals from computer system 104 may be transmitted wirelessly to irrigation controller 106.

In an embodiment, computer system 104 may operate on electricity drawn from alternating current source 108 through irrigation controller 106. In some embodiments, computer system 104 may be separately coupled to an alternating current source. In certain embodiments, computer system 104 may include a battery that allows the computer system to function during a power outage. In some embodiments, computer system 104 may rely at least partially on an internal energy source (e.g., a battery). In some embodiments, computer system 104 may generate the energy required for operation of the computer system. For example, computer system 104 may include a solar panel and a battery.

Irrigation controller 106 may be operated manually or automatically. In an embodiment, irrigation controller 106 may include a user interface to allow a user to specify an irrigation schedule. In some embodiments, irrigation controller 106 may be coupled to master control valve 110. Signals from irrigation controller 106 may be used to open and/or close master control valve 110. In some embodiments, computer system 104 may operate master control valve 110 directly or through irrigation controller 106. In certain embodiments, master control valve 110 may be coupled to one or more conduits 112. Opening master control valve 110 may allow water to flow from water source 114 to conduits 112. Water may flow from conduits 112 toward one or more irrigation devices 116. Irrigation devices 116 may deliver water to zone to be irrigated 118. In some embodiments, zone to be irrigated 118 may include sensing unit 102 and/or computer system 104. In some embodiments, sensing unit 102 and/or computer system 104 may be located outside of (e.g., near) zone to be irrigated 118.

Figure 2:
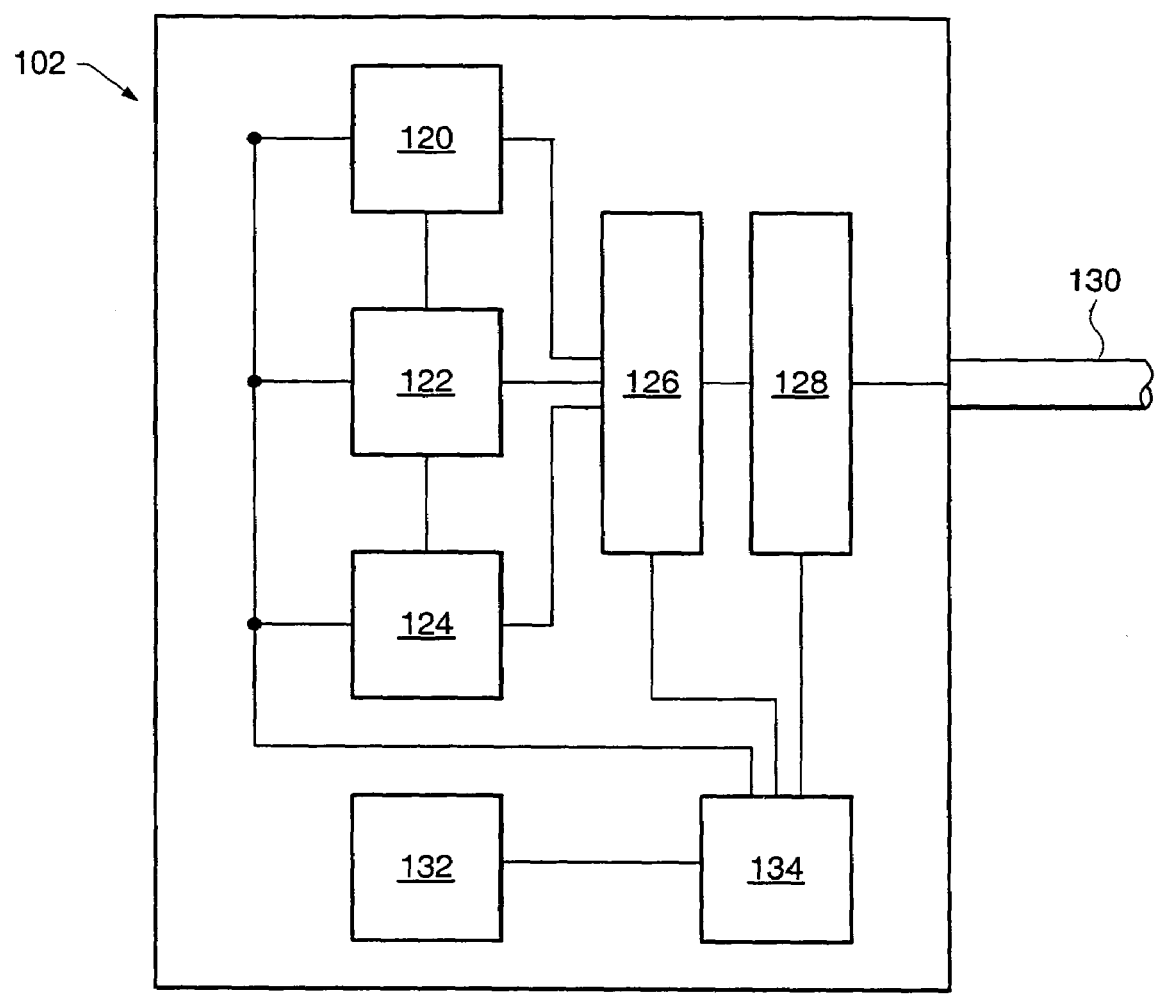
FIG. 2 depicts a schematic of an embodiment of a sensing unit.

FIG. 2 depicts a schematic of an embodiment of sensing unit 102. In an embodiment, sensing unit 102 may include moisture gauge 120, temperature sensor 122, and/or wind sensor 124. Moisture gauge 120, temperature sensor 122, and/or wind sensor 124 may be coupled to processor 126. Processor 126 may be coupled to transmitter 128. Transmitter 128 may be coupled to antenna 130. In some embodiments, sensing unit 102 may include solar panel 132 and battery 134. Electrical output from solar panel 132 and/or battery 134 may be coupled to moisture gauge 120, temperature sensor 122, wind sensor 124, processor 126, and/or transmitter 128. Transmitter 128 may be designed to provide signals from processor 126 through antenna 130 to a computer system of a water irrigation system.

Figure 3:
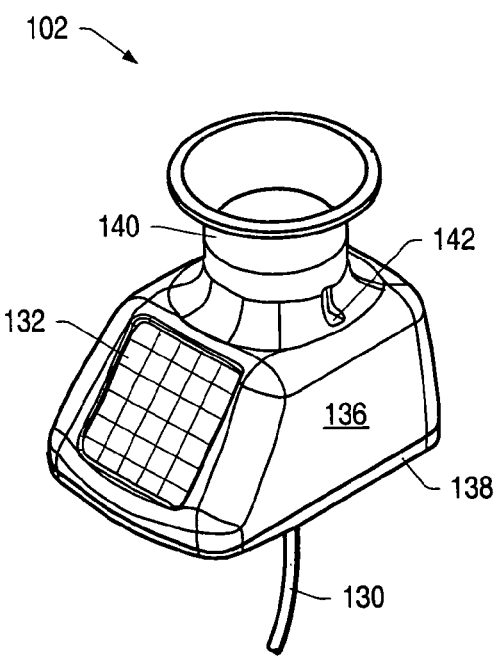
FIG. 3 depicts a perspective view of an embodiment of a sensing unit.

FIG. 3 depicts a perspective view of an embodiment of sensing unit 102. Sensing unit 102 may include body 136 and base 138. Body 136 and/or base 138 of sensing unit 102 may be made of materials including, but not limited to, polymers and composites. Base 138 may be coupled to (e.g., press-fit onto) and/or sealed to body 136 of sensing unit. In some embodiments, sensing unit 102 may be a unitary piece. In certain embodiments, antenna 130 may extend from base 138. Body 136 may house electronic components (e.g., on one or more circuit boards) of sensing unit 102. Solar panel 132 may be coupled to body 136 of sensing unit 102.

In some embodiments, body 136 of sensing unit 102 may include portion 140. Portion 140 may be of any design (e.g., extension, recess) to accept or house one or more components of one or more sensors of sensing unit 102. A portion of body 136 may form a substantially closed base for portion 140, such that an interior of sensing unit 102 is not exposed to environmental elements (e.g., wind, rain). Portion 140 may include opening 142. Opening 142 may be designed to allow air to flow into and/or through portion 140 and/or allow moisture (e.g., precipitation) that enters portion 140 to drain from sensing unit 102 above body 136.

Figure 4:
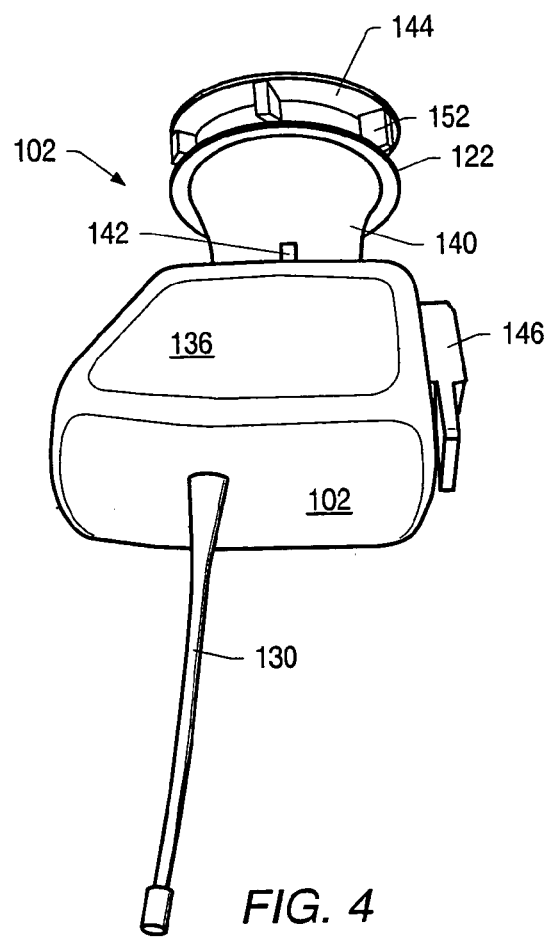
FIG. 4 depicts a perspective view of an embodiment of a sensing unit.

In some embodiments, as depicted in FIG. 4, collector 144 may be positioned in portion 140 of sensing unit 102. Collector 144 may be a part of a moisture gauge. Body 136 may include a seal (e.g., a gasket) between portion 140 and an interior of sensing unit 102. Sensor components in portion 140 may be coupled to or communicate with other components of sensing unit 102 (e.g., electronic components) in body 136 of the sensing unit. In certain embodiments, collector 144 may be removable from sensing unit 102 (e.g., for cleaning).

In some embodiments, mount 146 may be coupled to sensing unit 102. Mount 146 may be used to secure sensing unit 102 to a structure such as, but not limited to, a house, a building, or a pole near or in a zone to be irrigated. Mount 146 may allow sensing unit 102 to be mounted at a height elevated relative to another portion of a water irrigation system. For example, sensing unit 102 may be mounted at least 2 m above the ground or at least 2 m above a height of another portion of the water irrigation system (e.g., a computer system, one or more irrigation devices, an irrigation controller). In certain embodiments, mount 146 may be coupled to sensing unit 102 such that the sensing unit may be angled and/or rotated relative to the mount. In some embodiments, angling and/or rotating sensing unit 102 relative to mount 146 may allow for positioning and/or cleaning of the sensing unit (e.g., the collector). In some embodiments, positioning sensing unit 102 may include aligning collector 144 such that a longitudinal axis of the collector is substantially perpendicular to a surface of the zone to be irrigated.

As depicted in FIG. 3, solar panel 132 may be mounted in sensing unit 102. Solar panel 132 may be, for example, SP4-80-8 from Plastecs Co. (Webster, Mass.). A blocking diode (e.g., B150DICT-ND from Digi-Key, Thief River Falls, Minn.) may be used with solar panel 132, such that the solar panel/blocking diode combination functions as a charger. In some embodiments, battery 134 (depicted in FIG. 2) may allow for operation of sensing unit 102 for an extended length of time (e.g., at least two weeks) in restricted sunlight. Battery 134 may be rechargeable. In certain embodiments, battery 134 may be a NiCad battery (e.g., from Panasonic, Secaucus, N.J.). Battery 134 may have a long life (e.g., up to or greater than 5 years) to reduce maintenance, expense, and/or operator intervention.

Sensing unit 102 may be advantageously positioned to promote exposure of solar panel 132 to sunlight. For example, sensing unit 102 may be advantageously positioned such that solar panel 132 is facing substantially southward with an angle of inclination of about 45°. In an embodiment, solar panel 132 may be located such that the amount of sunlight received per unit area by the solar panel is within one standard deviation of the average amount of sunlight received per unit area by the zone to be irrigated. Solar panel 132 may receive sunlight and produce electricity from the received sunlight. In some embodiments, electricity from solar panel 132 may power at least a portion of sensing unit 102 and/or at least a portion of a computer system of a water irrigation system. For example, electricity from solar panel 132 may power one or more sensors of sensing unit 102 including, but not limited to, a moisture gauge, a wind sensor, and a temperature gauge. Powering sensing unit 102 with solar panel 132 and battery 134 may facilitate installation, reduce maintenance, and enhance portability of the sensing unit.

In an embodiment, solar panel 132 in combination with sensing unit 102 may provide a signal that is a function of received sunlight to a computer system of a water irrigation system. In some embodiments, a computer system may assess a signal that is a function of sunlight received by a solar panel to inhibit irrigation during daylight hours. In some embodiments, a computer system may assess solar insolation from one or more signals that are a function of sunlight received by a solar panel. In certain embodiments, irrigation may be inhibited when assessed solar insolation near or in a zone to be irrigated exceeds a selected value. Inhibiting irrigation during daylight hours or when solar insolation exceeds a selected value may promote more efficient water usage by reducing an amount of moisture lost to evaporation.

In an embodiment, solar insolation may be assessed by monitoring electrical output from a solar panel. For example, output from a solar panel may be monitored throughout a day to assess a length of exposure of the solar panel to sunlight as well as an intensity (e.g., an average intensity) of the sunlight. Zonal ET may be assessed using solar insolation data in combination with other data (e.g., temperature, wind speed, and precipitation data) collected near or in a zone to be irrigated. Zonal climatological data (e.g., solar insolation, temperature, wind speed, and precipitation data) may be averaged over a length of time (e.g., a month), and used to assess average zonal ET for the length of time. Seasonal (e.g., monthly) zonal ET may be stored in a computer system of a water irrigation system and may be used in assessing a water requirement and/or an irrigation need of a zone to be irrigated.

Using data from a sensing unit with a solar panel to assess climatological conditions advantageously allows ET to be calculated without an in-ground moisture sensor. Thus, a solar-powered sensing unit/computer system combination may provide a more reliable method implemented with more durable equipment (e.g., requiring less maintenance) than methods and/or devices requiring ground-level and/or in-ground sensors.

Figure 5:
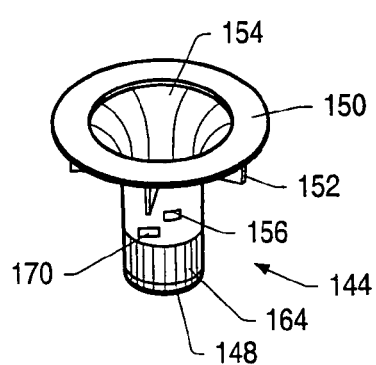
FIG. 5 depicts a perspective view of an embodiment of a collector for a moisture gauge.

FIG. 5 depicts a perspective view of an embodiment of collector 144. Collector 144 may be designed such that a rate of evaporation of moisture from the collector is within about 10% of an average rate of evaporation of moisture from a zone to be irrigated. Collector 144 may be made from materials including, but not limited to, polymers and composites. At least a portion of collector 144 may be cone-shaped. A thickness of collector 144 may range from about 0.1 cm to about 0.4 cm. For example, a thickness of collector 144 may be about 0.2 cm. Collector 144 may be colored (e.g., a shade of green) to approximate a color of vegetation in a zone to be irrigated. A height of collector 144 from base 148 to lip 150 may range from about 5 cm to about 8 cm. For example, a height of collector 144 may be about 6.8 cm.

In some embodiments, lip 150 of collector 144 may have an inner diameter ranging from about 3 cm to about 8 cm and an outer diameter ranging from about 5 cm to about 10 cm. For example, lip 150 may have an inner diameter of about 4.75 cm and outer diameter of about 8 cm. Lip 150 may be shaped, sized, and/or angled to allow collection of an amount of moisture that reflects an average amount of moisture received by a zone to be irrigated. In certain embodiments, collector 144 may include two or more projections 152. For example, collector 144 may include five projections 152. Projections 152 may be radially distributed beneath lip 150 about an outer circumference of collector 144. Projections 152 may maintain a space between lip 150 of collector 144 and body 136 of sensing unit 102, as shown in FIG. 4. The space between lip 150 of collector 144 and body 136 (e.g., portion 140) of sensing unit 102 may allow air flowing near or in a zone to be irrigated to enter the sensing unit.

Projections 152 may be sized and/or shaped to provide structural support to lip 150 and/or to provide a desired elevation of collector 144 from body 136 of a sensing unit. In certain embodiments, projections 152 may be formed as an integral part of collector 144. In certain embodiments, projections 152 may be formed separately and coupled to collector 144. Projections 152 may extend from an underside of lip 150 down a side of collector 144. In some embodiments, projections 152 may have a height ranging from about 1 cm to about 3 cm. For example, projections 152 may have a height of about 1.5 cm. A maximum width of projections 152 may be chosen such that the projections do not extend beyond an outer diameter of lip 150. In some embodiments, a width of projections 152 may range from about 1 cm to about 3 cm. For example, a maximum width of projections may be about 1.75 cm. A thickness of projections 152 may range from about 0.1 to about 0.4 cm. In some embodiments, a thickness of projections 152 may be about 0.2 cm.

Collector 144 may have opening 154. Moisture (e.g., precipitation) may enter collector 144 through opening 154 and accumulate in a lower portion of the collector above base 148. Collector 144 may be designed (e.g., sized, shaped, colored, textured) to collect moisture such that the amount of moisture collected above base 148 approximates an average amount of moisture received by a zone to be irrigated. In some embodiments, collector 144 may include opening 156 to allow moisture to drain from collector 144, thereby limiting an accumulation depth of moisture in the collector. In certain embodiments, an accumulation depth of moisture in collector 144 may be limited to about the depth that can be absorbed by a zone to be irrigated before runoff occurs (e.g., about 0.6 cm, about 1.3 cm). Collector 144 may be designed (e.g., sized, shaped, colored, textured) such that a rate of evaporation of moisture from the collector approximates an average rate of evaporation of moisture from the zone to be irrigated.

In an embodiment, an upper portion of opening 154 of collector 144 may be ellipsoidal. In some embodiments, an upper portion of collector 144 may be curved and/or tapered. For example, about 1 cm to about 5 cm, or about 2.75 cm of an upper portion of collector 144 may be curved and/or tapered. In some embodiments, an opening of collector 144 may range in diameter from about 3 cm to about 7 cm at lip 150. For example, opening 154 may have a diameter of about 4.75 cm at lip 150. In certain embodiments, opening 154 may be curved smoothly with a decreasing radius toward base 148 to form a cone with an ellipsoidal internal shape.

In an embodiment, a lower portion of collector 144 may be cylindrical with an inside diameter ranging from about 1 cm to about 5 cm. For example, opening 154 may have a diameter of about 2.75 cm just above base 148. In some embodiments, a ratio of a diameter of opening 154 at lip 150 to a diameter of the opening just above base 148 may range from about 1 to about 3. For example, a ratio of a diameter of opening 154 at lip 150 to a diameter of the opening at base 148 may be about 1.7.

Figure 6:
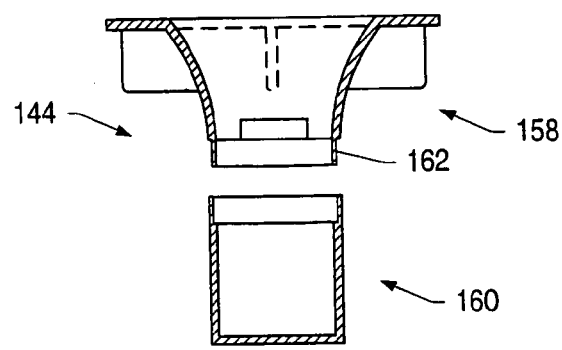
FIG. 6 depicts a cross-sectional view of an embodiment of a two-piece collector for a moisture gauge.

In an embodiment, collector 144 may be a unitary piece. In some embodiments, collector 144 may include two or more coupled portions. FIG. 6 depicts cross-sectional views of upper portion 158 and lower portion 160 of an embodiment of collector 144. In some embodiments, upper portion 158 may be tapered. In an embodiment, a portion of the collector may be curved along a longitudinal axis of the collector. For example, an angle of the curve relative to the longitudinal axis of the collector may range from about 0° near a middle portion of the collector to about 45° at an upper portion of the collector. In certain embodiments, upper portion 158 may include recessed portion 162. Lower portion 160 may be substantially cylindrical. Lower portion 160 may have a substantially circular cross section. Lower portion 160 may have an inside surface designed to snugly receive recessed portion 162 of upper portion 158. For example, recessed portion 162 may fit in lower portion 160 with a frictional fit. In some embodiments, a snap lock, threading, or other fastening system may be used to secure two or more portions of a collector together.

Moisture gauge 120 (depicted schematically in FIG. 2) may include a resonant circuit housed in sensing unit 102. In some embodiments, a resonant circuit may include an RC oscillator. The resonant circuit may be designed to detect a presence of moisture in collector 144 or a change in an amount (e.g., depth, volume) of moisture in the collector. A resonant circuit designed to detect a presence of moisture in collector 144 or a change in an amount of moisture in the collector may include, for example, plates of a capacitor positioned around a lower portion of collector 144. In some embodiments, plates of a capacitor (e.g., two copper plates) may be substantially sealed in a flex circuit. FIG. 5 depicts flex circuit 164 wrapped around a lower portion of collector 144 (e.g., just above base 148). Flex circuit 164 may be a plug-in flex circuit.

As moisture is accumulated in collector 144, a dielectric constant between the plates of the capacitor may change, thus changing a frequency of the resonant circuit. A change in frequency of the resonant circuit may be assessed to quantify an amount (e.g., height, volume) of moisture or a change in an amount of moisture in collector 144. For example, a resonant circuit may be designed to sense drops flowing through collector 144. In certain embodiments, a height of moisture in collector 144 may be detected to within about 0.3 cm. Changes in frequency of the resonant circuit may be used by the computer system to assess an amount of moisture received by the zone to be irrigated and/or an evaporation rate of water near or in the zone to be irrigated.

Figure 7:
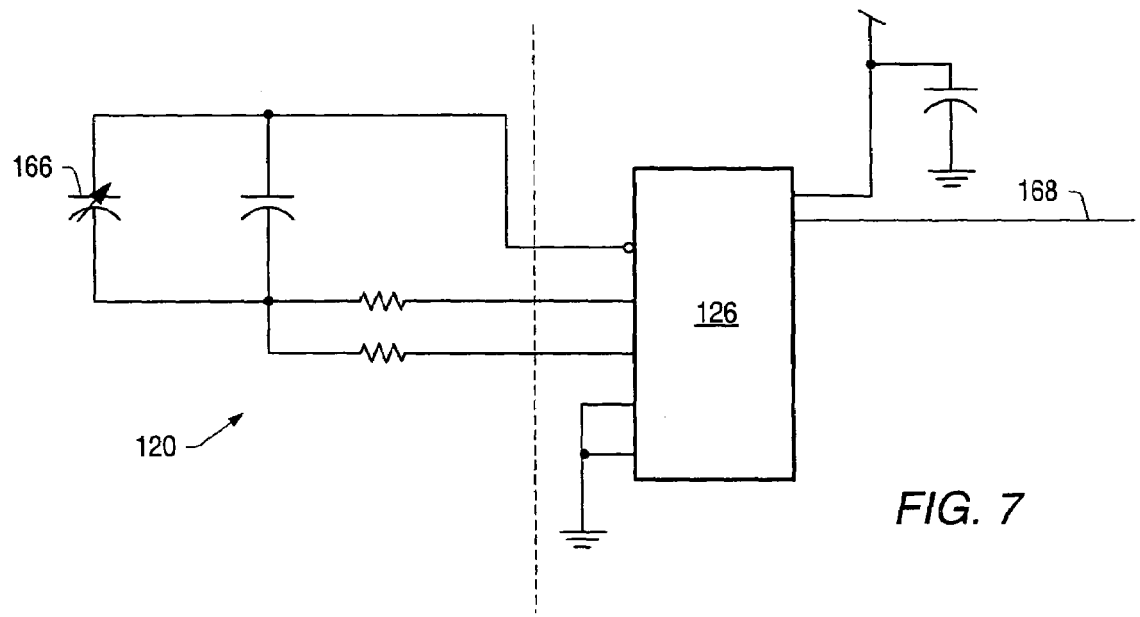
FIG. 7 depicts a schematic of components of a moisture gauge.

FIG. 7 depicts a schematic of an embodiment of components of moisture gauge 120 coupled to processor 126. Moisture gauge 120 may include capacitor 166 (e.g., in flex circuit 164) designed to detect changes in an amount of moisture in a collector of the moisture gauge. With collector 144 positioned in portion 140 of sensing unit 102, leads from capacitor 166 may be fed through an opening in body 136 of the sensing unit and coupled to other electronic components of moisture gauge 120 (e.g., on a sensor board positioned in the body of the sensing unit). The opening in body 136 through which the leads from capacitor 166 are fed may be substantially sealed such that an interior of sensing unit 102 is not exposed to environmental elements.

In some embodiments, capacitor 166 may operate through a range of several hundred picofarads (pF), allowing relatively high resolution while requiring relatively low power. For example, capacitor 166 may operate through a range of about 20 pF to about 300 pF. When collector 144 is empty, capacitor 166 may register about 20 pF. When collector 144 is full, the capacitance may register about 300 pF. An amount (e.g., a volume) of moisture in collector 144 may be assessed by monitoring a frequency in a resonant circuit that is a function of the capacitance of capacitor 166. In certain embodiments, an amount of moisture in collector 144 may be measured in increments of about 0.2 cm to about 0.5 cm (e.g., about 0.3 cm). One or more signals from moisture gauge 120 may be provided to processor 126 of a sensing unit. Processor 126 may provide signal 168 to a transmitter of the sensing unit for transmission to a computer system of a water irrigation system.

Signal 168 from processor 126 may be used in assessing zonal ET, assessing an irrigation need, or for immediate control of a water delivery system. In some embodiments, irrigation may be inhibited when precipitation near or in a zone to be irrigated exceeds a selected value (e.g., about 0.3 cm). In certain embodiments, signal 168 from a moisture gauge may be monitored to assess a rate of evaporation of moisture from the moisture gauge. Irrigation may be inhibited while a selected amount of moisture is in a collector of a moisture gauge. For example, irrigation may be inhibited while an amount of moisture in the moisture gauge exceeds about 0.3 cm. Inhibiting irrigation during rainy conditions may promote more efficient water usage by conserving water when an irrigation need of a zone to be irrigated is met by precipitation.

In an embodiment, sensing unit 102 may include temperature sensor 122, as depicted schematically in FIG. 2. Temperature sensor 122 may include, for example, a thermistor. For example, temperature sensor 122 may be a 470 KΩ, 3% thermistor available from Digi-Key (DB1485-ND). In some embodiments, temperature sensor 122 may be positioned inside body 136 of sensing unit 102. A signal from temperature sensor 122 may be provided to a computer system of a water irrigation system. In certain embodiments, a computer system may inhibit irrigation when a temperature near or in a zone to be irrigated falls below a minimum value and/or exceeds a selected value. Temperatures measured by temperature sensor 122 may have an accuracy of ±0.25° C. Inhibiting irrigation when a temperature falls below a minimum value (e.g., about 2° C.) may protect portions of a water irrigation system from damage related to freezing conditions. In some embodiments, the computer system may open a drip bypass system in the water irrigation system so water flow through the drip bypass system will inhibit expansion damage caused by a phase change of water in conduits of the irrigation system. Inhibiting irrigation when a temperature exceeds a selected value (e.g., about 30° C.) may promote more efficient water usage by, for example, reducing an amount of moisture lost to evaporation.

In an embodiment, sensing unit 102 may include wind sensor 124 (depicted schematically in FIG. 2) to detect wind speed at the sensing unit. Wind sensor 124 may be of any design capable of assessing wind speed near or in a zone to be irrigated. Wind sensor 124 may be able to detect wind speed within about ±3 mph. In some embodiments, electricity provided by a solar panel of sensing unit 102 may power wind sensor 124. Wind sensor 124 may be designed to reduce production costs and current consumption and improve efficiency and circuit life span while allowing relatively accurate assessment of wind speed at a range of temperatures, including temperatures over about 30° C.

Wind sensor 124 may be designed with components including, but not limited to, thermistors, resistors, one or more analog to digital converters, and one or more operational amplifiers. In an embodiment, wind sensor 124 may employ a thermistor differential scheme with a separate temperature calibration thermistor. A portion of wind sensor 124 may be positioned in sensing unit 102 between an interior surface of portion 140 and an exterior surface of collector 144. In some embodiments, wind sensor 124 may be coupled to an exterior surface of collector 144 and positioned near opening 142 of portion 140, such that air flowing through the portion passes the wind sensor.

Figure 8:
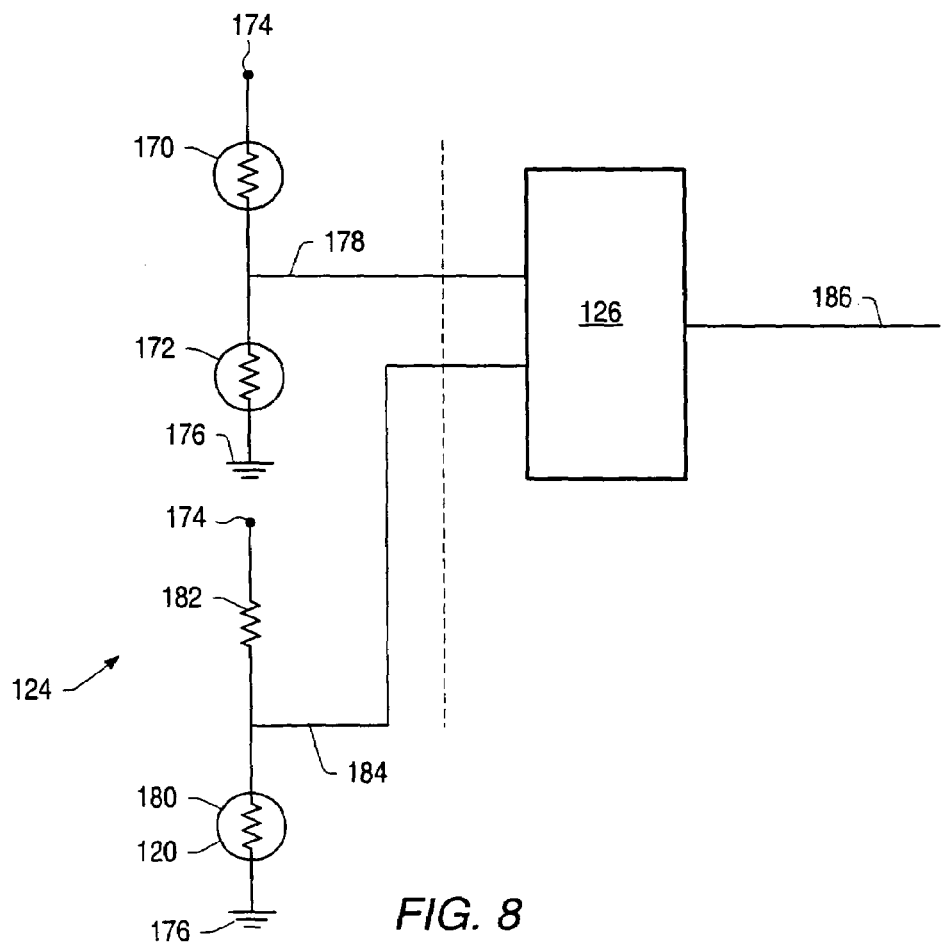
FIG. 8 depicts a schematic of components of a wind sensor.

FIG. 8 depicts a schematic of an embodiment of components of wind sensor 124 coupled to processor 126 with a thermistor differential scheme designed to measure wind speed. Flow thermistor 170 may be positioned in a flow of air through a portion of a sensing unit. In an embodiment, air may flow into portion 140 of sensing unit 102 around projections 152 of collector 144. Air may exit portion 140 of sensing unit 102 through opening 142, depicted in FIG. 4. Flow thermistor 170 may be sealed and coupled to an outside surface of collector 144, as depicted in FIG. 5. Collector 144 may be positioned in (e.g., coupled to) portion 140 such that flow thermistor 170 is near opening 142. Leads from flow thermistor 170 may be fed through an opening at a base of portion 140 into body 136 of sensing unit 102 and coupled with other components of wind sensor 124 as depicted in FIG. 8. The opening at the base of portion 140 through which the leads are fed may be substantially sealed such that an interior of sensing unit 102 is protected from environmental elements. In some embodiments, leads from flow thermistor 170 and flex circuit 164 may be fed through the same opening in body 136 of sensing unit 102.

Reference thermistor 172, depicted in FIG. 8, may be positioned inside a body of a sensing unit (e.g., out of a direct flow of air). Reference thermistor 172 and flow thermistor 170 may be exposed to substantially the same temperature. In some embodiments, flow thermistor 170 and reference thermistor 172 may be substantially the same. For example, thermistors 170, 172 may be 470 KΩ thermistors, such as BC1485-ND available from Digi-Key. In certain embodiments, flow thermistor 170 and reference thermistor 172 may be connected across source voltage 174 and ground 176. The temperature of flow thermistor 170 is balanced with the temperature of reference thermistor 172 by sensing temperature through resistance via voltage and adding power until the flow thermistor is at the same temperature as the reference thermistor. The ratio of reference power to flow power is a function of the wind speed and temperature of the air. Output 178 (e.g., a ratio of reference power to flow power) may be provided to, for example, an operational amplifier or an analog to digital converter on processor 126.

As a temperature of the ambient air increases, the ratio of reference power to flow power decreases. In some embodiments, output 178 may be corrected for temperature (e.g., made linear across a wide temperature range). For example, calibration thermistor 180 and resistor 182 may be connected across source voltage 174 and ground 176. Calibration thermistor 180 may be substantially the same as reference thermistor 172. For example, calibration thermistor 180 may be a 470 KΩ themistor. Resistor 182 may be, for example, a 470 KΩ resistor. In some embodiments, calibration thermistor 180 may be positioned inside a body of a sensing unit proximate reference thermistor 172. In an embodiment, reference thermistor 172 and calibration thermistor 180 may both be positioned inside a sensing unit. In some embodiments, reference thermistor 172 may also function as temperature sensor 122. Output 184 may be used in combination with a lookup table that includes correction factors for wind speed as a function of temperature for relatively accurate assessment (e.g., ±3 mph) of wind speed by processor 126. Signal 186 may be a function of wind speed. In some embodiments, signal 186 may be provided (e.g., through a transmitter) to a computer system of a water irrigation system.

In an embodiment, a sensing unit of a water irrigation system may include a solid-state wind sensor. The wind sensor may include a digital solid-state flow sensor and a digital solid-state reference sensor. The digital solid-state sensors may be coupled such that output from the digital solid-state sensors is a function of wind speed at the digital solid-state flow sensor. A computer system may use the output from the digital solid-state sensors to assess a wind speed at the digital solid-state flow sensor. The computer system may control irrigation using at least the assessed wind speed.

In some embodiments, irrigation may be inhibited when signal 186 indicates that wind speed near or in a zone to be irrigated exceeds a selected value for a selected length of time. Setting a minimum length of time for the windy conditions to persist reduces the possibility of inhibiting irrigation in response to an isolated gust of wind. Inhibiting irrigation during windy conditions may promote efficient water usage by reducing an amount of moisture dispersed beyond a zone to be irrigated. In some cases (e.g., certain landscaping designs, certain prevailing climatological conditions), it may be undesirable for irrigation to be inhibited when a wind speed near or in a zone to be irrigated exceeds a selected value for a selected length of time. In these cases, an operator may choose to override immediate control of irrigation by excessive wind speed.

In an embodiment, sensing unit 102 may communicate with a computer system via transmitter 128 (depicted schematically in FIG. 2). For example, sensing unit 102 may communicate via radiofrequency radiation with a computer system of a water irrigation system. In some embodiments, communication between sensing unit 102 and a computer system of a water irrigation system may be secure, thereby inhibiting unauthorized input to the computer system. Transmitter 128 may be, for example, radiofrequency transmitter/receiver TXE-433-KH-WD available from Linx Technologies (Grants Pass, Oreg.). In certain embodiments, signals from transmitter 128 may be sent to a computer system via antenna 130. Antenna 130 may be, for example, a stubby whip antenna available from Linx Technologies. In some embodiments, antenna 130 may be a circuit board antenna or a drop wire. In certain embodiments, a frequency of signals from transmitter 128 may be 433 MHz (unlicensed band).

A transmitter may send a signal from a sensing unit to a computer system of a water irrigation system. Signals from the sensing unit may include, but are not limited to, information from a wind sensor, a temperature sensor, a moisture gauge, and a solar panel. In some embodiments, a signal from a sensing unit may be used to assess zonal ET or an irrigation need. In certain embodiments, signals from a sensing unit may be used for immediate control of an irrigation controller. For example, if a signal from a moisture gauge indicates that at least 0.3 cm of moisture has been collected in one day, one or more irrigation cycles may be inhibited or delayed by a computer system.

A mounting location for a sensing unit may be chosen such that the sensing unit is fully exposed to environmental conditions. For example, the sensing unit may be mounted on an eave of a house to allow full exposure to the environment near or in a zone to be irrigated. The sensing unit may be advantageously positioned such that sunlight, wind, and precipitation may reach the sensing unit. Positioning the sensing unit away from natural barriers (e.g., trees) and artificial barriers (e.g., fences) may promote more accurate assessment of climatological conditions, including solar insolation, wind speed, and precipitation. In some embodiments, a sensing unit may be positioned facing southward at a 45° angle of inclination to enhance collection of sunlight by a solar panel. Mounting a sensing unit outside of (e.g., near) a zone to be irrigated and/or elevating the sensing unit relative to irrigation devices may allow moisture collected in a collector to be identified as precipitation rather than water from an irrigation device. In some embodiments, angling and/or rotating a sensing unit relative to a mount may allow water and/or debris to be removed from the sensing unit (e.g., from the collector).

Figure 9:
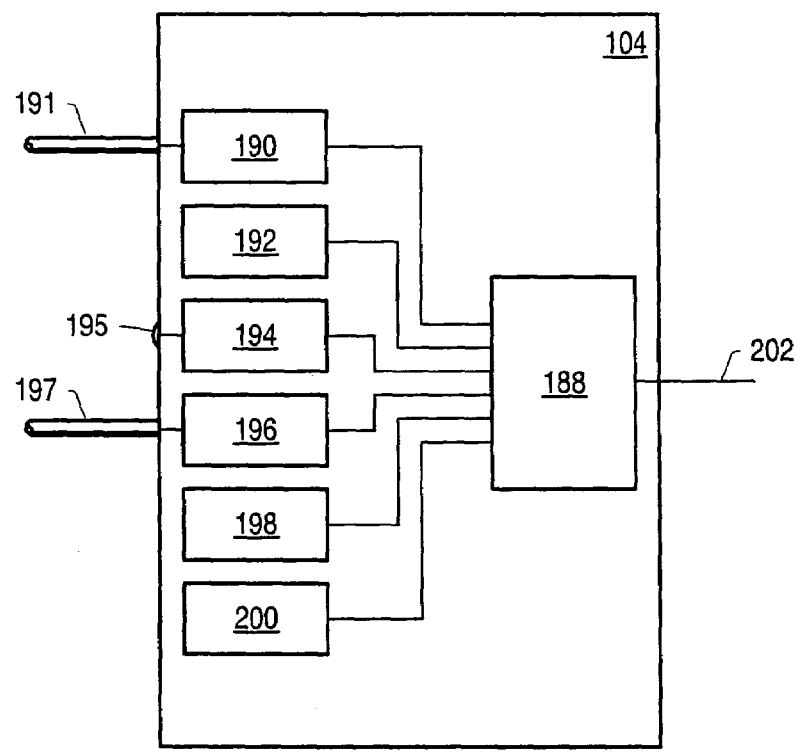
FIG. 9 depicts a schematic of an embodiment of a computer system.

FIG. 9 depicts a schematic view of an embodiment of computer system 104 of a water irrigation system. All or a portion of computer system 104 may be powered by an external source of energy (e.g., an alternating current source). Computer system 104 may be designed to assess a water requirement of a zone to be irrigated using historical climatological data and/or climatological data collected near or in a zone to be irrigated. Computer system 104 may be designed to receive electrical and/or electromagnetic input from a sensing unit of a water irrigation system.

In an embodiment, computer system 104 may include processor 188 and receiver 190. Antenna 191 may be coupled to receiver 190. Antenna 191 may receive signals from antenna 130 coupled to transmitter 128 of sensing unit 102, depicted schematically in FIG. 2. In some embodiments, receiver 190 may be part of a radiofrequency transmitter/receiver pair available from, for example, Linx Technologies (e.g., RXD-433-KH-ND, with antenna). In certain embodiments, receiver 190 may be part of a radiofrequency transmitter/receiver pair available from Microchip (Chandler, Ariz.). Receiver 190 may relay information received from a sensing unit to processor 188 of computer system 104. Processor 188 may be a microcontroller (e.g., PIC 18F8520-ND available from Digi-Key; PIC 16C65A by Microchip).

Processor 188 may assess climatological conditions and/or zonal ET using electrical input from receiver 190. In some embodiments, processor 188 may use regional ET stored, for example, in data storage unit 192 to assess a water requirement of a zone to be irrigated. Data storage unit 192 may be used to store information including, but not limited to, ET data (e.g., ET tables), temperature data, wind speed data, rainfall data, soil type, vegetation type, stress factor, and vegetation water usage. In some embodiments, a matrix of ET values may include ET tables listed as a function of variables including, but not limited to, geographic area (e.g., regions determined by postal code, in some cases down to areas with populations as small as 50,000), soil type (e.g., five different types), and vegetation type (e.g., four plant types). In certain embodiments, data storage unit 192 may be a component of processor 188.

In an embodiment, computer system 104 may include infrared receiver 194 with detector 195. In some embodiments, infrared receiver 194 may be an infrared transceiver. Infrared receiver 194 may allow a user to input irrigation parameters with portable (e.g., hand-held) infrared transmitting devices including, but not limited to, personal digital assistants, cell phones, and laptop computers. A user may be able to input initialization information including, but not limited to, soil type, vegetation type, stress factor, region in which a zone to be irrigated is located, time of day, day of a week, month of the year, and/or calendar date. Infrared receiver 194 may be, for example, IrDA transceiver 6P2W004YP with a Microchip MCP2140-I/SP IrDA Microcontroller available from Sharp (Camas, Wash.). An IrDA (Infrared Data Association) standards unit may facilitate communication between a user and a water irrigation system.

In certain embodiments, computer system 104 may include device 196 (e.g., a pager device) to receive community irrigation instructions. Device 196 may include, but is not limited to, a single frequency device or an assignable device. Device 196 may be coupled to antenna 197. Antenna 197 coupled to device 196 may receive community irrigation instructions to override an irrigation schedule of a water irrigation system. For example, community irrigation instructions may result in termination of an irrigation cycle, reduction in duration and/or frequency of an irrigation cycle, rescheduling of an irrigation cycle, and/or initiation of an irrigation cycle. In some embodiments, community irrigation instructions may inhibit irrigation by a water irrigation system (e.g., during drought conditions) until instructions are received to resume irrigation.

In some embodiments, computer system 104 may include real-time clock 198, and/or battery 200. Real-time clock 198 may provide a reliable time of day input to computer system 104 (e.g., following initialization). In some embodiments, battery 200 may provide a source of back-up power during loss of a primary power source (e.g., during a power outage). In certain embodiments, battery 200 may be a primary power source for computer system 104.

In an embodiment, computer system 104 may be coupled to and/or communicate with an irrigation controller of a water irrigation system. In some embodiments, computer system 104 may be coupled to a master control valve of a water delivery system. In certain embodiments, computer system 104 may provide output 202 to an irrigation controller and/or to a master control valve of a water irrigation system. Thus, computer system 104 may operate a master control valve of a water irrigation system directly or through an irrigation controller.

Figure 10:
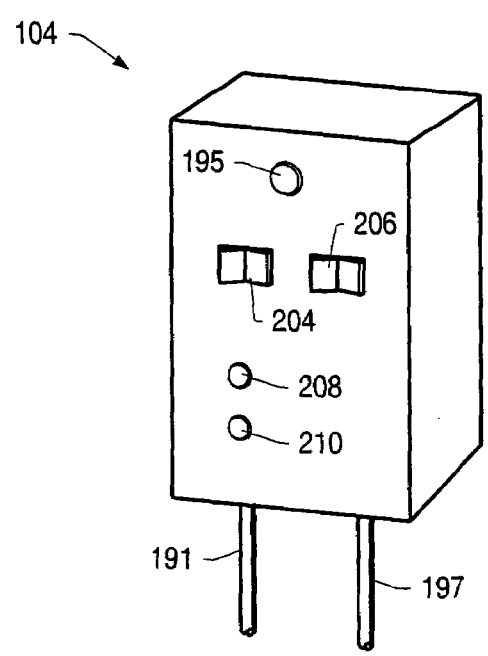
FIG. 10 depicts a perspective view of an embodiment of an exterior of a computer system.

FIG. 10 depicts a perspective view of an embodiment of an exterior of computer system 104. Other embodiments of computer system 104 may differ in appearance. Other embodiments of computer system may include different (e.g., additional, fewer) elements (e.g., switches, indicators). Power switch 204 may be used to control delivery of electricity to computer system 104. In an embodiment, computer system 104 may include antenna 191 designed to receive input from a transmitter of a sensing unit. In some embodiments, computer system may include detector 195. Detector 195 may be, for example, an infrared detector coupled to infrared receiver 194, depicted schematically in FIG. 9. With power switch 204 in the "on" position, detector 195 may detect a signal (e.g., an initialization signal) from an infrared emitting device. In certain embodiments, computer system 104 may include antenna 197 for receiving community irrigation instructions.

In some embodiments, computer system 104 may include wind switch 206. With wind switch 206 in the "off" (e.g., override) position, windy conditions may cause computer system 104 to terminate irrigation. With wind switch 206 in the "on" position, an irrigation cycle would be unaffected by windy conditions. In certain embodiments, computer system 104 may include one or more LEDs. In an embodiment, LED 208 may indicate a state of computer system 104 (e.g., a lighted LED indicates that the computer system is operating). In an embodiment, LED 210 may indicate that computer system 104 is awaiting set-up (e.g., waiting for initialization information).

In an embodiment, a computer system, a sensing unit, a water delivery system, and/or an irrigation controller may be installed to form a water irrigation system at a zone to be irrigated. In some embodiments, a computer system and a sensing unit may be added to an existing water delivery system and/or irrigation controller to conserve water (e.g., from 30–60% of normal water usage by in-ground sprinklers), reduce irrigation expenses (e.g., from 40–70% of water bills with graduated usage rates), reduce maintenance of vegetation in a landscape setting (e.g., reduce mowing), and/or improve health of vegetation in a zone to be irrigated.

Installation of a sensing unit may include mounting and positioning the sensing unit in an open, elevated location. Installation of a computer system may include mounting the computer system in an accessible location near or in a zone to be irrigated (e.g., proximate an irrigation controller). In some embodiments, installation of a computer system may include providing power (e.g., from an irrigation controller) to the computer system. The computer system may be initialized with appropriate input parameters (e.g., time, date, postal code, soil type, vegetation type). Installation may be simple and quick (e.g., a computer system and a sensing unit may be installed in about 15 minutes). In certain embodiments, an irrigation controller may be adjusted to provide a known amount of water to a zone to be irrigated before operation of a computer system is initiated.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A water irrigation system, comprising:
   a computer system;
   a sensing unit comprising a moisture gauge, wherein the moisture gauge comprises:
      a collector configured to receive moisture;
      a flex circuit coupled to the collector, wherein the flex circuit comprises a capacitor, and wherein the capacitor is part of a resonant circuit; and
      wherein the collector and the flex circuit are configured such that a change in an amount of moisture in the collector alters a frequency of the resonant circuit;
   wherein the sensing unit is configured to assess an amount of moisture in the collector and provide output that is a function of the amount of moisture in the collector to the computer system; and
   wherein the computer system is configured to control irrigation of a zone to be irrigated at least partially based on the assessed amount of moisture in the collector.

2. The water irrigation system of claim 1, wherein the sensing unit is elevated from the computer system by at least 2 meters.

3. The water irrigation system of claim 1, wherein the computer system is configured to control irrigation at least partially based on community irrigation instructions.

4. The water irrigation system of claim 1, wherein the sensing unit comprises a solar panel, wherein the solar panel is configured to receive sunlight, to produce electricity from the received sunlight, and to supply at least a portion of the electricity to the sensing unit, wherein the sensing unit is configured to provide output that is a function of climatological conditions to the computer system.

5. The water irrigation system of claim 1, wherein the sensing unit comprises a solar panel, wherein the solar panel is configured to receive sunlight, to produce electricity from the received sunlight, and to supply at least a portion of the electricity to the sensing unit, wherein the sensing unit is configured to provide output that is a function of climatological conditions to the computer system, and wherein the computer system is configured to control irrigation at least partially based on the output provided by the sensing unit.

6. The water irrigation system of claim 1, wherein the sensing unit comprises a solar panel, wherein the solar panel is configured to receive sunlight, to produce electricity from the received sunlight, and to supply at least a portion of the electricity to the sensing unit, wherein the sensing unit is configured to provide output that is a function of climatological conditions to the computer system, and wherein the computer system is configured to assess an irrigation need of the zone to be irrigated at least partially based on the output provided by the sensing unit.

7. The water irrigation system of claim 1, wherein the sensing unit comprises a solar panel, wherein the solar panel is configured to receive sunlight, to produce electricity from the received sunlight, and to supply at least a portion of the electricity to the sensing unit, wherein the sensing unit is configured to provide output that is a function of climatological conditions to the computer system, wherein the computer system is configured to assess an irrigation need of the zone to be irrigated at least partially based on the output provided by the sensing unit, and wherein the computer system is configured to at least meet the irrigation need of the zone to be irrigated.

8. The water irrigation system of claim 1, further comprising a solar panel configured to receive sunlight and to use the received sunlight to produce electricity, wherein the sensing unit is configured to provide output that is a function of the received sunlight to the computer system.

9. The water irrigation system of claim 1, wherein the solar panel configured to receive sunlight, to use the received sunlight to produce electricity, and to supply at least a portion of the electricity to the sensing unit.

10. The water irrigation system of claim 1, wherein the computer system comprises an infrared receiver.

11. The water irrigation system of claim 1, wherein the computer system comprises an infrared transceiver.

12. The water irrigation system of claim 1, wherein the sensing unit comprises a radiofrequency transmitter, and wherein the radiofrequency transmitter is configured to provide output from the sensing unit to the computer system.

13. The water irrigation system of claim 1, wherein the computer system comprises a radiofrequency receiver.

14. The water irrigation system of claim 1, further comprising one or more valves that are operated by the computer system.

15. The water irrigation system of claim 1, further comprising one or more valves that are operated by the computer system, wherein at least one of the valves is coupled to one or more conduits, and wherein at least a portion of each conduit is configured to carry water.

16. The water irrigation system of claim 1, further comprising one or more valves that are operated by the computer system, wherein at least one of the valves is coupled to one or more conduits, wherein at least a portion of each conduit is configured to carry water, and one or more irrigation devices, wherein at least one of the irrigation devices is coupled to at least one of the conduits.

17. The water irrigation system of claim 1, further comprising one or more valves that are operated by the computer system, wherein at least one of the valves is coupled to one or more conduits, wherein at least a portion of each conduit is configured to carry water, and a source of water that is coupled to at least one of the conduits.

* * * * *